(12) United States Patent
Gallay et al.

(10) Patent No.: US 11,242,177 B2
(45) Date of Patent: Feb. 8, 2022

(54) DOUBLE TAMPER EVIDENCE CAP FOR A NECK OF A CONTAINER, SYSTEM INCLUDING SAID CAP AND A CONTAINER AND METHOD FOR MANUFACTURING SAID CAP

(71) Applicant: SOCIETE ANONYME DES EAUX MINERALES D'EVIAN ET EN ABRÉGÉ "S.A.E.M.E", Evian-les-bains (FR)

(72) Inventors: Renaud Gallay, Evian les Bains (FR); Philippe Nusbaum, Orthez (FR); Michel Roussy, Lugrin (FR); Romain Savajano, Margencel (FR)

(73) Assignee: SOCIETE ANONYME DES EAUX MINERALES D'EVIAN ET EN ABRÉGÉ "S.A.E.M.E", Evian-les-bains (FR)

( * ) Notice: Subject to any disclaimer, the term of this patent is extended or adjusted under 35 U.S.C. 154(b) by 81 days.

(21) Appl. No.: 16/335,764

(22) PCT Filed: Sep. 23, 2016

(86) PCT No.: PCT/IB2016/001550
§ 371 (c)(1),
(2) Date: Mar. 22, 2019

(87) PCT Pub. No.: WO2018/055428
PCT Pub. Date: Mar. 29, 2018

(65) Prior Publication Data
US 2019/0225389 A1    Jul. 25, 2019

(51) Int. Cl.
B65D 41/34    (2006.01)
B65D 1/02    (2006.01)
(Continued)

(52) U.S. Cl.
CPC .......... B65D 41/3428 (2013.01); B29D 1/00 (2013.01); B29D 99/0096 (2013.01);
(Continued)

(58) Field of Classification Search
CPC ............ B65D 41/3428; B65D 41/3447; B65D 41/3442; B65D 1/0246; B65D 41/3466; B65D 41/3452
See application file for complete search history.

(56) References Cited

U.S. PATENT DOCUMENTS 4,540,100 A    9/1985 Willis
4,572,387 A    2/1986 Luker et al.
(Continued)

FOREIGN PATENT DOCUMENTS

| CN | 102514807 | 6/2012 |
| WO | 2006/090137 | 8/2006 |
| WO | 2011/064489 | 6/2011 |

*Primary Examiner* — Stephen J Castellano
(74) *Attorney, Agent, or Firm* — Clark & Brody LP

(57) ABSTRACT

The invention pertains to a screw cap for a neck of a bottle composed of an upper part removeable from the neck and a lower park non-removeable from the neck and which is a tamper evidence band (TEB) linked to the cap's skirt by frangible connection bridges designed to be broken at the first licit opening of the bottle. TEB also displays any breaking of the cap before the first container opening, thanks to additional lower markers which are composed of annularly regularly distributed frangible connection bridges. Upper frangible bridges and lower frangible bridges are below the top edge of the neck in the original closed position of the cap and define a top ring of the TEB which is intact after the first licit opening.

12 Claims, 9 Drawing Sheets

(51) Int. Cl.
    *B29D 1/00*          (2006.01)
    *B29D 99/00*       (2010.01)
    *B67C 7/00*         (2006.01)
    *B29K 23/00*       (2006.01)

(52) U.S. Cl.
    CPC ....... *B65D 1/0246* (2013.01); *B65D 41/3442* (2013.01); *B65D 41/3447* (2013.01); *B67C 7/00* (2013.01); *B29K 2023/065* (2013.01)

(56) References Cited

U.S. PATENT DOCUMENTS 5,676,269 A     10/1997   Blake et al.
2003/0071007 A1*   4/2003   Ma et al.

\* cited by examiner

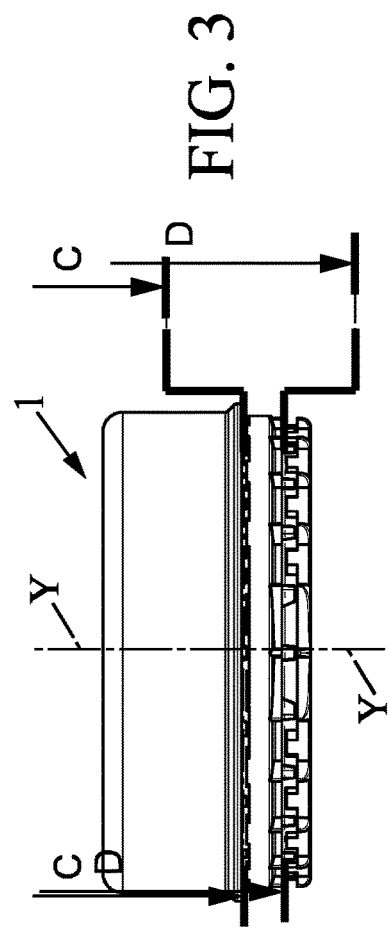
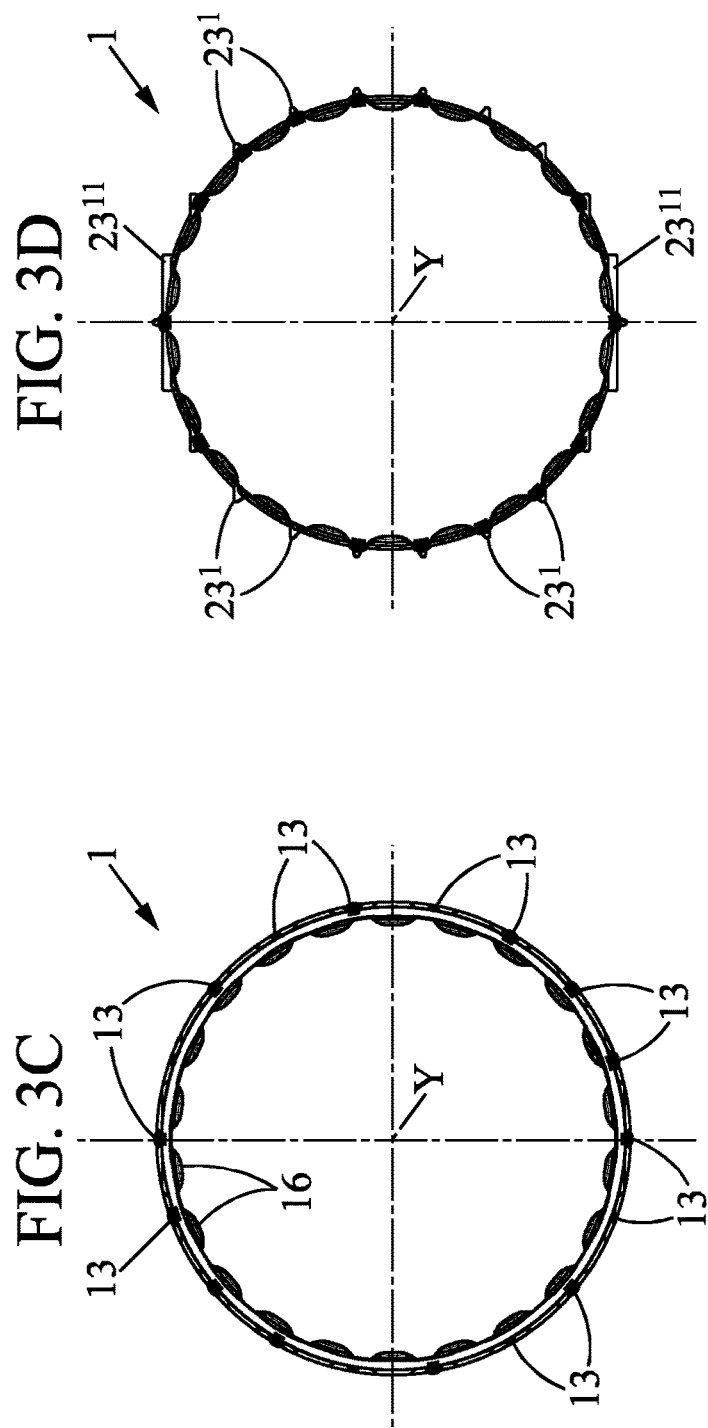

DOUBLE TAMPER EVIDENCE CAP FOR A NECK OF A CONTAINER, SYSTEM INCLUDING SAID CAP AND A CONTAINER AND METHOD FOR MANUFACTURING SAID CAP

This application is the national stage (Rule 371) of international application No. PCT/IB2016/001550 filed 23 Sep. 2016.

FIELD OF THE INVENTION

The invention relates to a cap for closing the neck of a container—preferably a bottle—suitable for containing water or other liquids for human consumption (generically drinking water hereafter).

More particularly, the cap according to the invention is a screw cap manufactured by moulding (i.a injection-molding or compression molding) of plastic material, such as a polyolefin, e.g polypropylene, a High Density PolyEthylene (HDPE), a Low Density PolyEthylene (LDPE), a Linear Low Density PolyEthylene (LLDPE), and mixtures and/or alloys thereof.

The container is usually a bottle, e.g a plastic ISBM bottle (ISBM: Injection Stretch Blow Molding). The constituent material of these bottles is typically a thermoplastic polymer for instance a PolyEthyleneTerephtalate (PET) or a PolyEthyleneFuranoate (PEP). These bottles are intended to contain drinks (e.g. water).

The cap includes an upper removable part (opening by unscrewing) and a non-removable part which is a Tamper Evidence Band TEB.

The system including such a cap container closed with said cap as well as the method for manufacturing said cap, are encompassed in the present invention.

BACKGROUND

Containers, especially bottles, are prone to infringement through the filling offence. This latter consists in filling empty containers bearing an authentic registered trademark, with a liquid (e.g. drinkable water) which is not the authentic liquid. Such a criminal act is not only deleterious for the brand image of the owner of the trademark, but represents also a major health risk, in view of the doubtful quality of the infringing liquid.

To fight against that some tamper-proof containers for drinking beverages have been developed.

In this respect, WO2011064489 (A1) discloses a lid 1, intended to be screwed onto the neck 2 of a bottle, which is open at its lower end and closed at its upper end with a bottom wall 10, at the outer periphery of which a tubular skirt 11 centered on the axis X-X and with a circular base extends axially downward. During the first and licit unscrewing of the lid 1, the skirt 11 is adapted so as to separate into two distinct portions, i.e. an upper portion 121, made with the bottom wall 10 in the same material, and a lower portion 122 initially connected to the upper portion 121 at a peripheral break line 20 axially located in the running portion of the skirt. The skirt 11 further comprises a peripheral break segment 28 distinct from the break line 20. The break segment 28, which is delimited distinctly from the break line 26 so as to form, between the break line 26 and the break segment 28 along the direction of the axis of the skirt 11, a strand 32 extending along the periphery of the skirt 11, wherein either each of both peripheral ends, or the running portion of said strand, is bound in a non-breakable way to a first of the removable and non-removable skirt portions, while, respectively either the running portion, or each of both peripheral ends of said strand is connected to the second of the skirt portions through a breakable bridge which is adapted, during the first opening of the lid, for successively resisting to failure while the break line is already broken, and for then breaking after plastic deformation of the strand and for thus separating the removable and non-removable skirt portions from each other.

CN102514807B describes a double etched line anti-fake bottle cap, comprising an upper sleeve (1) and a lower sleeve (2) that are connected with each other by an upper etched line. A lower etched line is provided below and in parallel with the upper etched line. A fracture zone (3) is formed between the upper and lower etched lines. The upper etched line is constituted by several upper notches (4) and upper connecting points (5) that are arranged in an alternative manner. The lower etched line is constituted by several lower notches (6) and lower connecting points (7) that are arranged in an alternative manner. The upper connecting points (5) correspond to the lower notches (6) longitudinally, and the lower connecting points (7) correspond to the upper notches (4) longitudinally. When the bottle cap is licitly opened at the first time, the fracture zone between two etched lines can be fractured under the shearing forces of the upper and lower sleeves in opposed directions such that the fracture zone is separated from the cap or deformed obviously. Thus, the upper and lower sleeves are not recoverable and the fracture zone cannot be connected with the upper sleeve again. It is a simple and obvious visible change to inform the user that this container has been opened before.

The faking markers of the caps according to this above-mentioned prior art include Tamper Evidence Band (TEB) made of superposed breaking lines. But these latter are only dedicated to warn the consumers of the bottle first opening.

The problem is that before said bottle normal first opening, the lawbreakers who want to fill fake and inferior products in the bottle, compete of ingeniousness to break in the bottle cap without damaging the TEB. Such a breaking in could be done by means of tools which play on the elasticity of the plastic material to remove the cap. Instead of or in addition to such a mechanical action, the lawbreakers can try to distend the cap through heating it (steaming).

It exists therefore an acute need of anti-fake systems comprising a cap and a bottle which, on the one hand, complicates the task of lawbreakers in breakings in before the first bottle opening, and on the other hand, give to consumers flagrant indication of said prior breakings in.

OBJECTIVES OF THE INVENTION

In the above recalled background, the invention aims at fulfilling at least one of the following objectives:

Said cap makes it possible to prevent breaking in of the bottle, by removing the cap without breaking the TEB, through inserting of a tool, possibly with heating of the cap to deform the plastic material of the cap.

1. Providing an improved container (e.g bottle) cap which complicates a lot the counterfeiting consisting in removing the cap, filling the container with a non-authentic liquid and put back sealingly the cap with no apparent signs of previous removal.
2. Providing an improved container (e.g bottle) cap which makes it possible to prevent breaking in of the bottle, before its first opening, by removing the cap without breaking the TEB, through inserting of a tool, possibly with heating of the cap to deform the plastic material of the cap.
3. Providing an improved tamperproof cap which shows obvious indications of the first opening as well as of any illicit opening before the first opening and of any re-use.
4. Providing an improved plastic injection molded cap for a plastic injection molded container (e.g bottle) which is a single use leak-proof closing.
5. Providing an improved tamperproof cap which fulfils at least one of the objectives 1 to 4 and having tamperproof means which make easier the opening of the cap.
6. Providing an improved tamperproof cap which fulfils at least one of the objectives 1 to 5 and having tamperproof means which enables waterproof or non-waterproof re-closings after a first opening.
7. Providing an improved tamperproof cap which fulfils at least one of the objectives 1 to 6, which makes it possible to render the appearance of the cap more attractive.
8. Providing an improved tamperproof cap which fulfils at least one of the objectives 1 to 7, which is economical and simple to manufacture by means of a injection process.
9. Providing a system composed of a screw cap as defined in at least one of the objectives 1 to 8 and of a container—e.g. a bottle—.
10. Providing a container—preferably a bottle—or preform for the manufacture by blowing of said container designed to be closed by a cap as defined in at least one of the objectives 1 to 8.
11. Providing a method for manufacturing a cap as defined in at least one of the objectives 1 to 8.
12. Providing a method for bottling a container—preferably a bottle—with a cap as defined in at least one of the objectives 1 to 8.
13. Providing a method for licitly opening a container—preferably a bottle—filled with a genuine commercial product and closed by a cap as defined in at least one of the objectives 1 to 10.

SUMMARY OF THE INVENTION

The invention aims at fulfilling the above mentioned objectives.

To this end, according to a first aspect, the invention provides a screw cap for a neck of a container—preferably a bottle—,
said cap comprising:
a top wall
an annular skirt extending downwardly from the top wall and having a bottom edge; and
a tamper evidence band (TEB) linked to the bottom edge of the skirt by
annularly —preferably regularly—distributed frangible connection bridges; said neck of the container being in a single piece with the rest of the container and having a top edge which delimits the opening of the container and which is in sealed contact with the lower face of the cap top wall in the closed position of said cap, namely the original position, before the first licit opening of the container by unscrewing the upper removable part of the cap, said first licit opening involving the rupture of the connection bridges which are so upper markers of said first licit opening;
wherein said TEB comprises a top ring and a bottom ring linked to the top ring by at least two annularly— preferably regularly—distributed additional frangible bridges;

wherein both frangible bridges and additional frangible bridges are below the top edge of the neck in the original position,
wherein the top ring of the TEB between frangible bridges and additional frangible bridges is intact after the first licit opening.

This peculiar double level of tamper evidence markers of this cap, particularly the upper frangible bridges and the additional frangible bridges which respectively define the top ring and the bottom ring, increases the safety of the consumers and guarantees the authenticity of the container closed by said cap.

The cap according to the invention does not include an in-bore fitment, especially an in-bore non return pouring fitment (one-way valve), which is secured within the container neck and within the cap and which is an additional piece between the cap and the container, so that the lower face of the top wall of the cap is not in sealed contact with the top edge of the edge in the original position of the cap closing the container.

These markers reveal unquestionably the breakings in and breakings in attempts prior to the first licit opening of the container, as well as the first regular opening of said container.

These double markers are quite easy to manufacture and do not burden the economy of the manufacturing method of the caps.

The cap according to the invention proceeds from combining the typical tamper evidence band (TEB) including the break line defining frangible bridges with evidence of prior breaking in which are located below the known break line of the TEB and which also constitutes an obstacle to any illicit mechanical and/or thermic cap removal.

The cap according to the invention is an improved container (e.g bottle) cap which is a single use leakproof closing, which shows obvious indications of an illicit opening and re-use, having tamperproof means which make easier the opening of the cap and which enables non-waterproof re-closings after a first opening. The invention offers a reinforced safety against misuses and infringements.

According to a preferred structural feature of the double level of frangible bridges of the cap according to the invention, the height $h^5$ of the top ring of the TEB is lower than the height $h^{11}$ of the skirt (11), preferably $h^5 \leq [h^{11}/2]$; more preferably $h^5 \leq [h^{11}/3]$.

Regarding the container (e.g. bottle) which is contemplated in combination with the cap (the system of the invention), its neck has advantageously an external face including downwardly and successively from the open top end: at least one thread, a lock ring and a support ring.

In a complementary manner, the skirt has an inner face presenting at least one inwardly extending upper shoulder which is intended to abut the lock ring of the neck, during the first licit opening.

Actually, the at least two frangible additional bridges are additional lower markers intended to display any breaking in of the cap before the first licit container opening.

According to a preferred embodiment, and in order to prevent the insertion of a tool in view of illicit removal of the cap prior to the $1^{st}$ opening of the container, the inner annular face of at least one—preferably of each—additional lower marker is inwardly set back (interval I) with respect to the peripheral end of the lock ring of the neck. Said interval I is the smallest as possible, while enabling the setting up of the cap onto the neck of container, during the bottling, after the filling of the container, on an industrial line. In this respect, the inner annular face of at least one—preferably of each— additional lower marker, is preferably at a minimum interstitial distance d of the facing external face of the neck, said distance being defined as follows, in an increasing order of preference: d≤3 mm; d≤2 mm; d≤1 mm; d≤0.5 mm; d≤0.01 mm.

Preferably, the cap comprises comprising at least one lower shoulder which extends inwardly from the inner face of the TEB, and which is intended to come close, and preferably to abut, the top face of a groove of the neck, during the container first opening. Such a feature prevents the introduction of a breaking in tool.

Advantageously, the upper shoulder and/or the lower shoulder is composed of several protusions, which are for instance annularly and regularly distributed.

According to an interesting feature of the invention, the marks given by the upper markers of said container first opening and by the additional lower markers of said container breaking in, are visible to the naked eye.

It is a peculiarity of the invention the additional lower markers are mechanically- and/or heat-deformable and include:

According to a first embodiment, at least one frangible additional bridge which connects the lower portion of the TEB to the upper portion of said TEB, and/or, according to a second embodiment, at least one outwardly, preferably radially, extending ribs.

Advantageously, the frangible additional bridges and/or the outwardly—preferably radially—extending ribs, are:

annularly—preferably regularly—distributed around the TEB, and/or parallel to the axis Y-Y of the cap.

In view of improving the mechanical strength of the frangible additional bridges of the additional lower markers, the bottom and/or the top of said at least one frangible additional bridges, comprise(s) a lug which extends outwardly from the lower portion of the TEB and/or from the upper portion of the TEB, each additional bridge being preferably located between a lower lug and an upper lug.

In the case where the mold for manufacturing the cap comprises an ejector of the type ram slide stroke, it is preferable that the cap includes at least two undercuts, advantageously two diametrally opposed undercuts, each undercut being for instance composed of at least three of the upper lugs and the three corresponding lower lugs, are gathered three by three, at the upper and lower levels, to form a superposed structural protruding unit, which is designed to improve the mechanical performances, said cap preferably comprising two superposed structural protruding units, advantageously diametrically opposed.

Always in this case, according to the here above mentioned second embodiment, at least, preferably at least three of the outwardly extending ribs, are gathered to form a single structural protruding unit, which is designed to improve the mechanical performances, said cap preferably comprising two single structural protruding units, advantageously diametrically opposed.

Outstandingly, the bridges of the upper markers and/or the additional bridges of the lower markers are separated from each other by openings which projections on a plane have a shape which is preferably and independently rectangular, trapezoidal or ovoid.

In a particular embodiment adapted to the manufacture of the cap's openings in the course of the manufacture of the whole cap by compression moulding, rather than by slitting afterwards a mold cap without openings, after the bottling, at least one of said opening being possibly partially closed by a counter-bridge extending upwardly from the bottom from the lower side of the opening or downwardly from the upper side of the opening. The counter-bridges make it possible to hinder crashing of the openings, especially during the setting up of the cap onto the container for closing the filled container, during the bottling.

According to an interesting feature of the invention, the cap is a plastic molded (e.g. compression, injection) cap, made from thermoplastic material chosen in the group comprising a polyolefin and preferably polypropylene, a High Density PolyEthylene (HDPE), a Low Density PolyEthylene (LDPE), a Linear Low Density PolyEthylene (LLDPE), and mixtures and/or alloys thereof.

Advantageously, the cap according to the invention can further comprise a plurality of ribs extending parallel to the central axis (A) on the outer surface of the skirt of the upper removable part of the cap.

According to a second aspect, the invention concerns a system composed of a screw cap according to at least one of any preceding claims and a container (3)—preferably a bottle—.

According to a third aspect, the invention concerns a container—preferably a bottle—or preform for the manufacture by blowing of said container, comprising a neck finish designed to be closed by a cap according to at least one of any preceding claims, said container being preferably made of polyester(s), advantageously, PolyEthyleneTerephtalate (PET) or PolyEthyleneFuranoate (PEF).

According to a fourth aspect, the invention concerns a method for manufacturing a cap (1) according to the invention comprising the steps of molding, in a cavity of a mold, the cap having a top wall and a pre-skirt;

possibly slitting the pre-skirt to make the annular openings obtaining so the frangible bridges, which delimit the skirt of the removable part of the cap (1), the upper and the lower portions of the TEB or non-removable part of the cap;

demolding the cap.

Advantageously, the annular openings between the upper frangible bridges, on the one hand, and the annular openings between the lower frangible bridges, on the other hand, are made by means of a tool which slits simultaneously the pre-skirt of the cap at two different heights, or with two tools which slit successively the pre-skirt of the cap, at two different heights.

According to a fifth aspect, the invention concerns a method for bottling a container—preferably a bottle—with a cap according to the invention comprising the steps of:

Providing a container-preferably a bottle;

Filling said container with a liquid;

Providing the cap with a pre-skirt;

Closing the container with the cap;

Possibly slitting the pre-skirt to make the annular openings, obtaining so the frangible bridges;

Packaging the closed container.

As the invention provides means for fighting against illicit opening of a container—preferably a bottle—filled with a genuine commercial product—preferably a beverage—, said invention also encompasses, in its sixth aspect, a method for licitly opening a container—preferably a bottle—filled with a genuine commercial product and closed by the cap according to the invention.

Said essentially consists in:

i. Grasping the cap with fingers, particularly the upper removable part of the cap, and more particularly the skirt of said upper part;

ii. Rotate the cap in the unscrewing direction in order that the at least upper shoulder of the inner face of the TEB abuts the lock ring of the neck and causes the rupture of the upper frangible connection bridges;

iii. Remove the cap from the neck.

Definitions

According to the terminology of this text, the following non limitative definitions have to be taken into consideration as illustrations for the construction of the present text:

Every singular designates a plural and reciprocally.

"the closed position of the cap or the original position" is the position wherein the cap is screwed in on the neck of bottle and sealingly closed said bottle, before the first licit opening.

"first licit opening" or "first opening" is the opening of the container which is regularly done by the consumer by unscrewing of the cap from the container (e.g. bottle), just before the first use.

"bottle" refers to any container for liquids, especially beverages like water: bottles, jugs, fountains, barrels, in particular adapted for beverage dispensers (Home & Office Delivery HOD), the capacity of which being, for instance, between 10 liters and 21 liters.

"thermoplastic" refers to mouldable thermoplastic homopolymer or copolymer that becomes pliable or moldable above a specific temperature, and returns to a solid state upon cooling.

"molded" refers to any forming technique of thermoplastic raw materials, such as extrusion blow moulding, extrusion profiles & sheet, injection blow moulding, injection moulding injection moulding (gas assisted), injection stretch blow moulding insert moulding, rotational moulding, compression moulding.

For convenience, the terms herein "upper", "top", "lower" and "bottom" correspond to a direction globally parallel to the axis Y-Y of the cap and of the container and refer to the system comprising the cap closing the container standing up through its base on a horizontal support which is the bottom; and the terms herein "inward" and "outward" are given with reference to the inside and the outside of the cap and of the container.

DETAILED DESCRIPTION OF THE INVENTION

Other objects and advantages of the invention will emerge from the following disclosure of particular embodiments of the invention given as non limitative examples, the disclosure being made in reference to the enclosed drawings in which:

FIG. 3 is a diametral section view according to the line A-A of the cap of FIG. 2;

FIG. 3C is a cross section view according to the line C-C of the cap of FIG. 3;

FIG. 3D is a cross section view according to the line D-D of the cap of FIG. 3;

On the Figures, the same reference numbers refer to the same or similar elements.

FIGS. 1 & 6 represent two embodiments of a screwed cap 1 for closing the opening of a container 3, such as a plastic bottle, adapted to receive a product, and especially a liquid product such as water, optionally flavoured and/or carbonated, soda, fruit juice, milk based liquid product or other.

Figure 4:
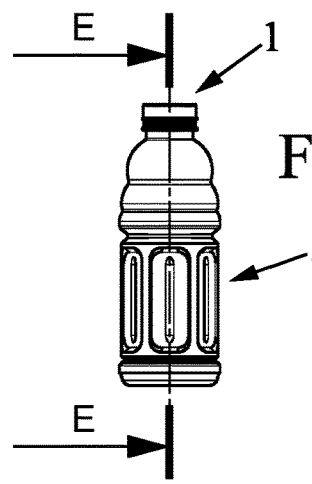
FIG. 4 is a front view of a system comprising the cap according to FIG. 1 tightly screwed on the neck of a bottle.

The bottle 3 shown on FIGS. 4, 4A, comprises a neck 2 delimiting the opening for pouring the product.

First Embodiment

In the illustrated first embodiment (FIGS. 1, 2, 2A, 2B, 3, 3C, 3D, 4, 4E, 5), the cap 1 presents a symmetry of revolution about a central axis Y and comprises a molded shell which is substantially annular and which is composed of an upper part 4 removable from the neck 2 of the bottle 3, and a lower part 5 non-removable from the neck 2.

The removable upper part 4 and the non-removable lower part 5 forms a whole which is snap-fitted by deformation on the neck 2 of the bottle 3, just after the filling of the bottle 3, to close it in the bottling industrial process. The non-removable lower part 5 is a Tamper Evidence Band (TEB) linked to the upper part 4 by frangible connection bridges 13, and the inner face 14 of which presents several inwardly extending shoulders 15, which are annularly distributed.

The TEB 5 comprises a top ring $5^t$ and a bottom ring $5^b$ linked to the top ring $5^t$ by the two annularly and regularly distributed additional frangible bridges 18.

Both frangible bridges 13 and additional frangible bridges 18 are below the top edge 2' of the neck 2 in the original position.

Figures 2, 2A:
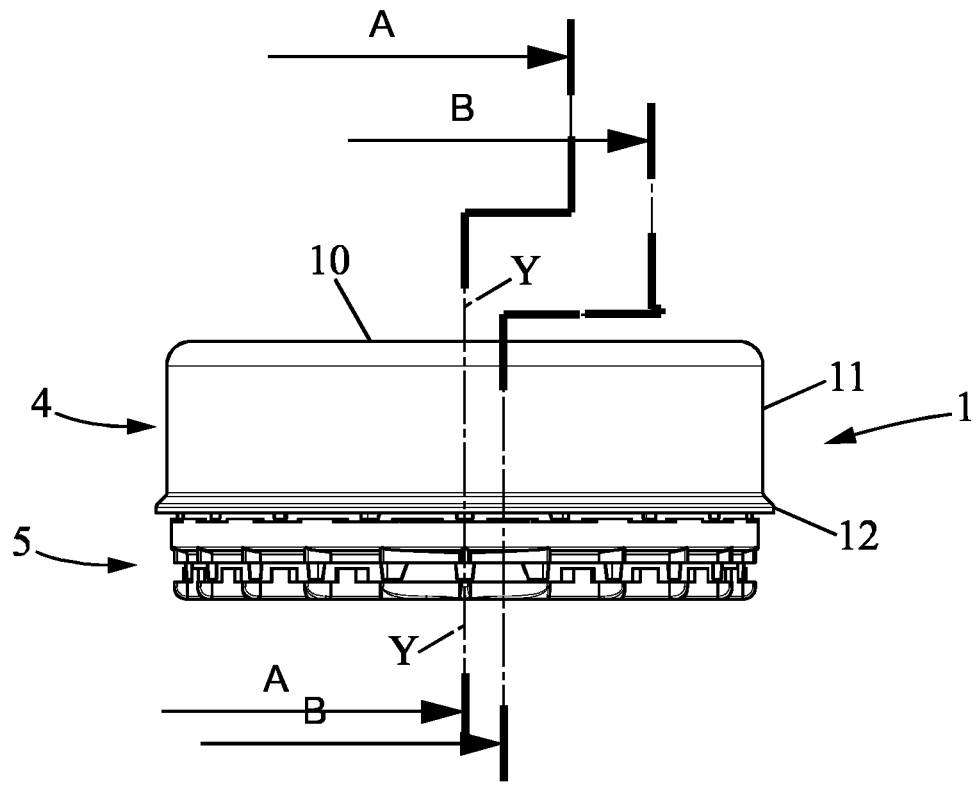
FIG. 2 is a front view of a cap of FIG. 1.
FIG. 2A is a section view in the diametral plane according to the line A-A of the cap of FIG. 2.
Figure 2B:
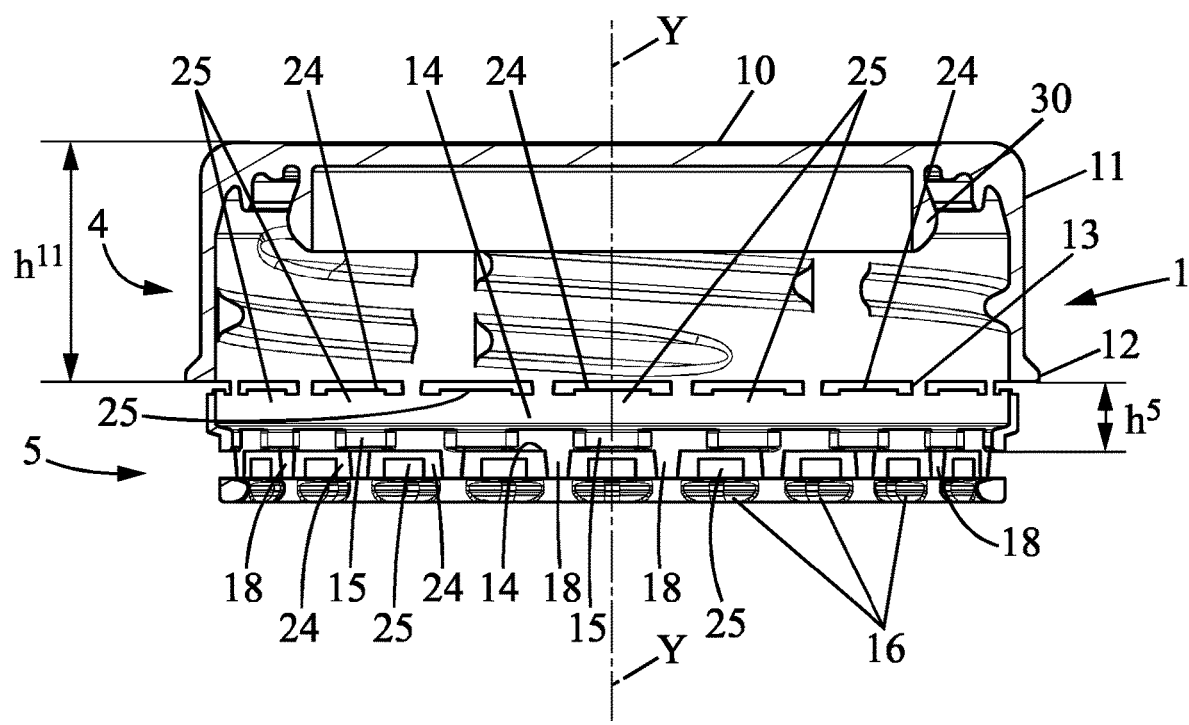
FIG. 2B is a section view in the non-diametral plane according to the line B-B of the cap of FIG. 2.
Figure 4E:
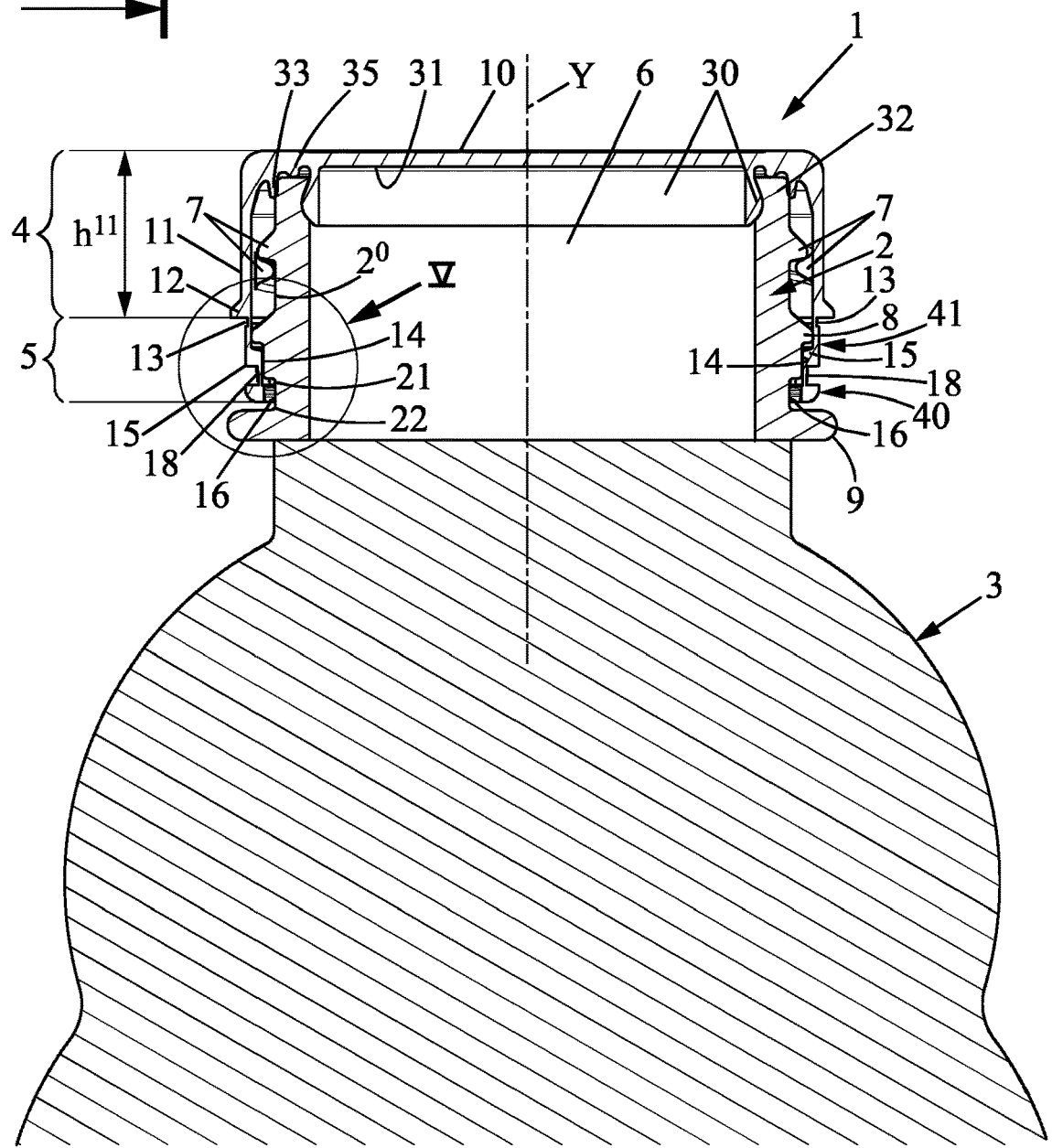
FIG. 4E is a diametral section view in the plane according to the line A-A of the cap of FIG. 4.
Figure 5:
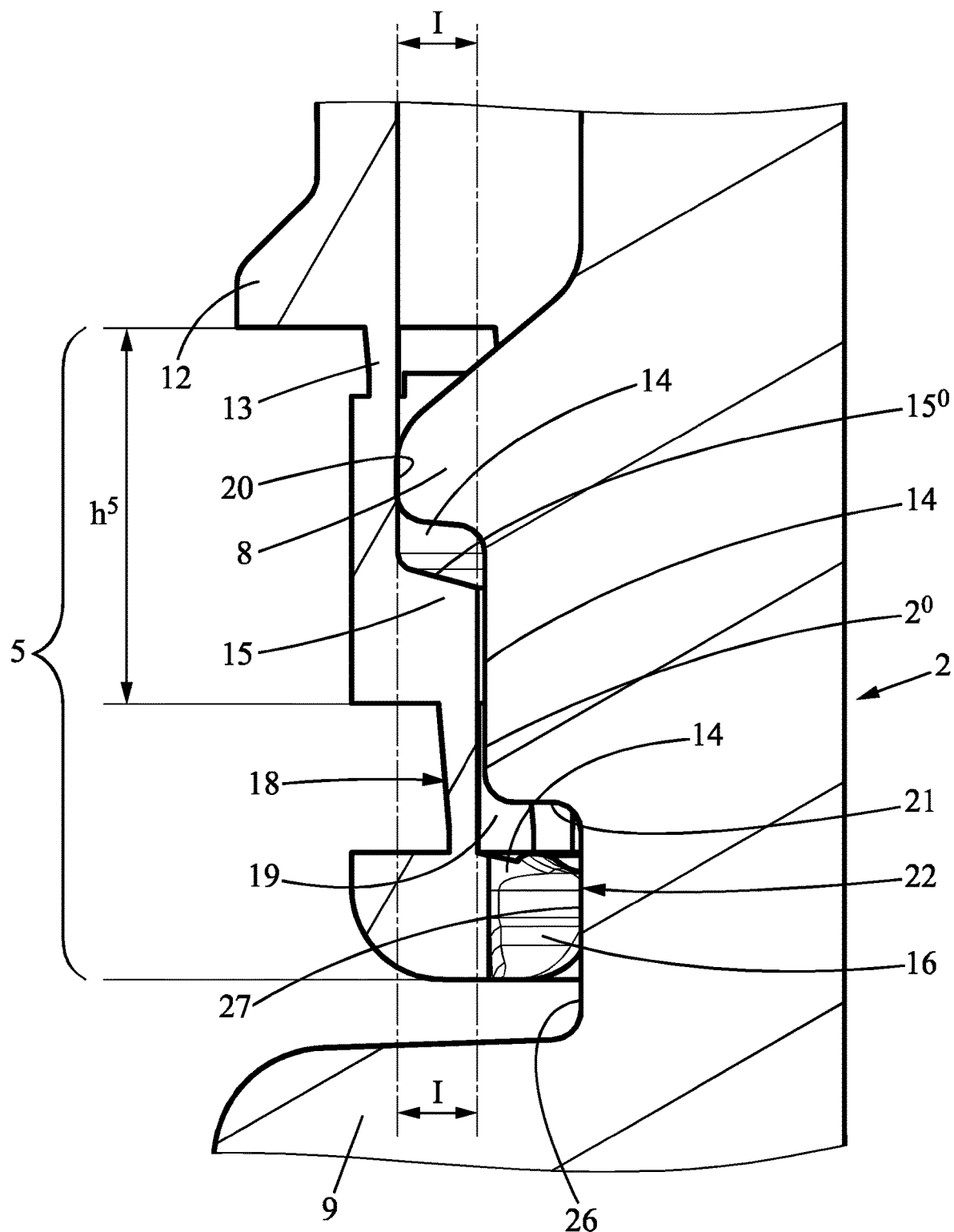
FIG. 5 is a magnified detailed view of the system/bottle shown on FIG. 4A.

As shown on FIGS. 2B & 5, the height $h^5$ of the top ring $5^t$ is measured from the top the lower bridges 18 to the top of the upper bridges 13, whereas the height $h^{11}$ is between the inner face of the bottom edge 12 of the skirt 11 and the top of the skirt 11 (FIGS. 2B & 4E), corresponding to the diametral plane of the upper face of the top wall 10 of the cap 1. For instance, $h^5 \approx h^{11}/3$.

Moreover, the neck 2 has an external face $2^o$ which includes downwardly and successively from the open top end 6: a thread 7, a lock ring 8 having a peripheral end 20 and a support ring 9. Therefore, during the first opening of the bottle 3 by unscrewing of the cap 1, the shoulders 15 of the cap 1 abut the lock ring 8 of the neck 2 which involve the breaking of the frangible connection bridges 13 and the splitting of the upper 4 and lower 5 parts of the cap. The TEB remains on the neck 2 of the bottle 3, as marker of the $1^{st}$ opening, whereas the upper part 4 is removed. This latter 4 can be then screwed back again on the neck 2. The broken bridges 13 indicate visually and also at the time of the further unscrewings that the $1^{st}$ opening has occurred.

Figure 7A:
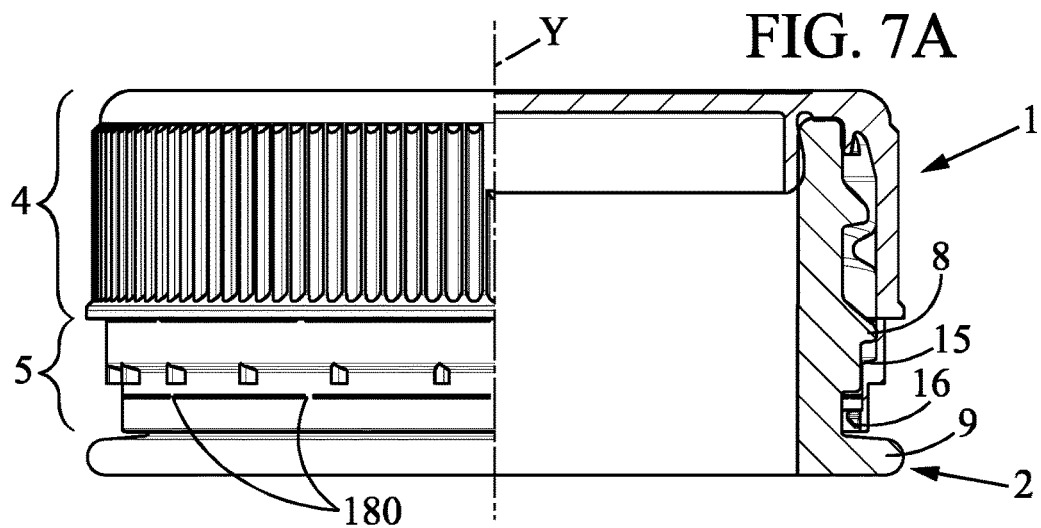
FIGS. 7A-7C are front views with partial section of the system constituted by the cap according to the first embodiment and closing the bottle's neck from a start position before the first opening (FIG. 7A) to a released position of the cap (FIG. 7C) wherein the cap can be removed and the frangible connection bridges are broken to mark the first licit opening.
Figure 7B:
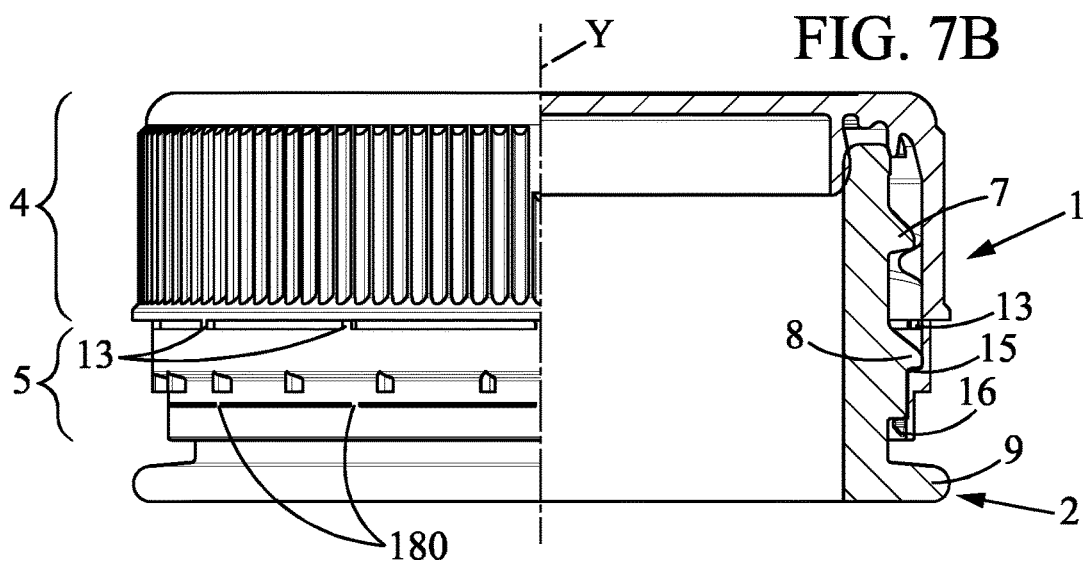
Figure 7C:
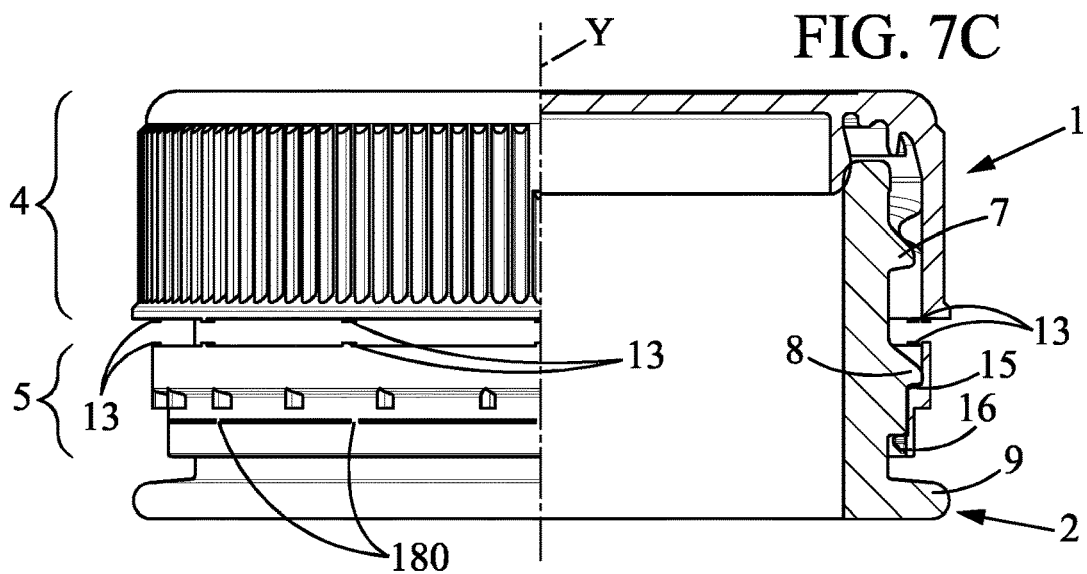
Figure 8A:
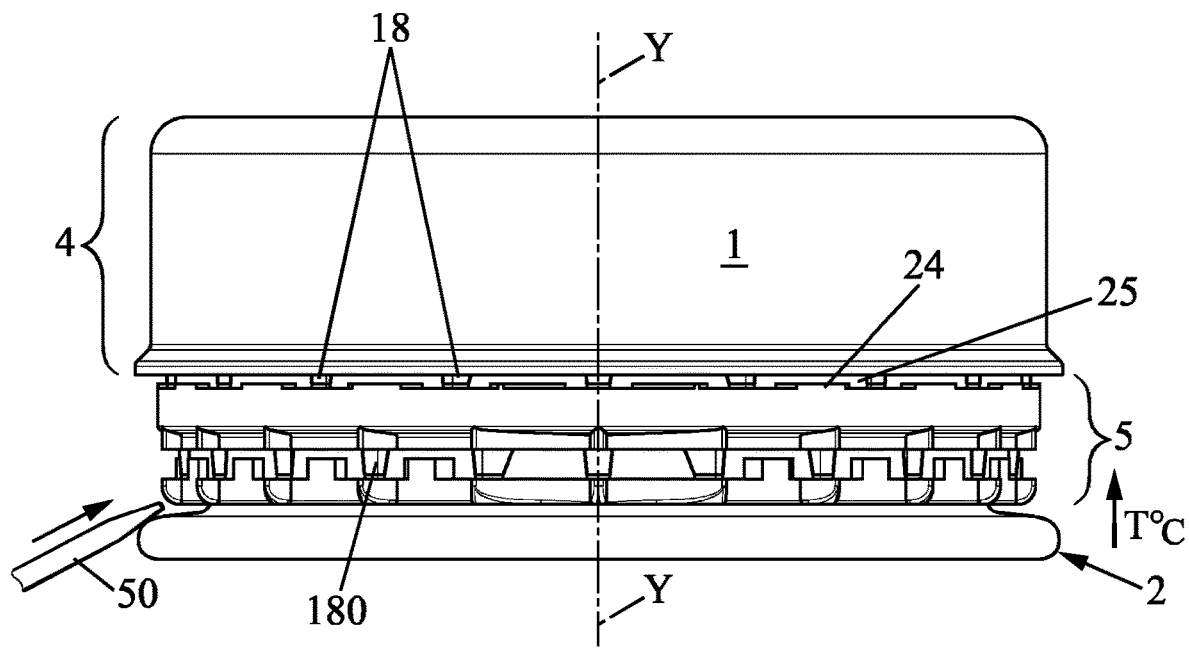
FIGS. 8A & 8B are front views of the system constituted by the cap according to the first embodiment and closing the bottle's neck, respectively before and after a breaking in by means of a tool and/or by thermic action; said breaking in occurring prior to the first opening.
Figure 8B:
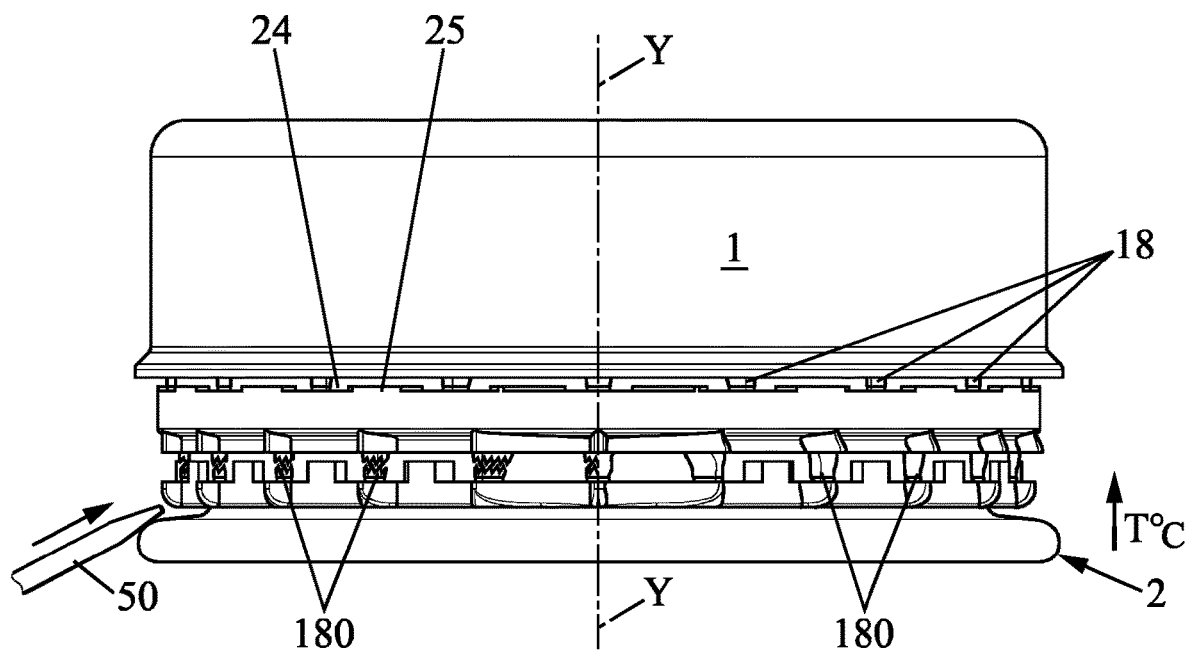

As an illustration of the consequence of the first licit opening of the bottle 3, reference is made to FIGS. 7A-7B-7C which show the cinematic of a regular $1^{st}$ opening by unscrewing of the cap, including the rupture of the frangible connection bridges 13 which enables the removal of the cap (FIG. 7D). The cap 1 of the FIG. 7A is in its closed position, namely its original position. The FIG. 7B shows an intermediary position of the cap 1, after a partial unscrewing. The shoulders 15 of inner face 14 of the cap 1 abut the lock ring 8. FIG. 7C represents the further step wherein the unscrewing has been done further and so as the frangible bridges 13 are broken. The top ring $5^t$ of the TEB 5 between frangible bridges 13 and additional frangible bridges 18 is intact after the first licit opening. After this breakage, the unscrewing goes further till the removal of the cap 1 from the neck 2.

Each shoulder 15 of the cap 1 according to the first embodiment of the invention herein described, has a slope 15° which extend downwardly and inwardly, with an angle comprised between 10 and 60°, i.a of 30° regarding the perpendicular to the axis Y-Y. This slope is close from the slope of the lower edge of the lock ring 8, which is the abutment of the shoulder 15.

In addition, the upper removable part 4 further comprises a top wall 10 and an annular skirt 11 extending downwardly from the top wall 10 and having a bottom edge 12 connected to the lower non-removable part 5 of the cap 1, through the frangible bridges 13. The outer surface of the skirt 11 of the cap 1 according to this first embodiment is the grip part for the cap's unscrewing. The grasping of the cap can be improved by means of a plurality of ribs 35 extending parallel to the central axis Y and equally distributed on the outer surface of the skirt 11, as shown on the variant of FIG. 11.

The inner face $11^1$ of the skirt 11 presents a thread 17 which is designed to cooperate with the complementary thread 7 of the outer face of the bottle's neck 2.

As represented on FIG. 4E and for providing a tight contact between the cap 1 and the neck 2 of the bottle 3, the top wall 10 has an annular crown 30 extending downwardly, perpendicular to its inner surface 31. The crown 30 defines a groove 32 with the annular seal lip 33. To improve tightness, on the one hand, an annular bulge 34 is provided on the outer surface of the free end of the crown 30, and, on the other hand, there is also an annular seal lip 35. In other embodiments, a tight attachment of the cap 1 to the neck could be provided in any other suitable manner.

The frangible connection bridges 13 are roughly regularly distributed on the circumference of the cap 1, according to the example shown on FIG. 4E. Said bridges 13 are separated by openings 24 which projection on plane can be rectangular (see for instance the $2^{nd}$ embodiment of FIG. 11) or almost rectangular because said opening is partially close by an annular counter-bridge 25, which extends upwardly in the direction Y-Y, as represented on FIGS. 1, 2A, 2B. According to a non-represented variant, the counter-bridges 25 could extend downwardly form the upper rim of the openings 25.

These counter-bridges 25 prevent the compression of the TEB during the snap-fitting of the cap on to the bottle 3, to cork the filled bottle 3 in the bottling.

Below its inner shoulders 15 which abut the lock ring 8 of the neck 2 at the time of the first opening, the TEB 5 has also, in addition to the frangible upper markers 13, some additional lower markers formed by annularly and regularly distributed bridges 18 which join a lower portion 40 of the TEB 5 to an upper portion 41.

Like the frangible upper bridges 13, the lower bridges 18 are separated by rectangular (in front view) openings 24—see FIG. 11—, or openings 25 partially closed by rectangular (front view FIGS. 2A & 2B) counter-bridges 25. These latter have the same function as their homologs of the upper openings inter upper bridges 13.

These additional lower markers 18 are designed to become signs of any breaking in of the system composed of the genuine filled bottle 3 and of the closing cap 1, before the first opening. Whatever be the breaking in, by mechanical and/or thermic action, the bridges 18 will be clearly deformed or broken.

The TEB 5 not only bears the additional lower markers 18 of breaking in, but is also designed to hinder any breaking in before the first opening. In this purpose, firstly, there is a lower level of shoulders 16 inwardly extending from the inner face 14 of the lower portion of the TEB, and secondly, the inner annular face 19 of the additional lower markers, i.e the frangible additional bridges 18, is both as close as possible from the facing external face 2° of the neck 2, and inwardly set back with respect to the peripheral end 20 of the lock ring 8 of the neck 2.

Figure 1:
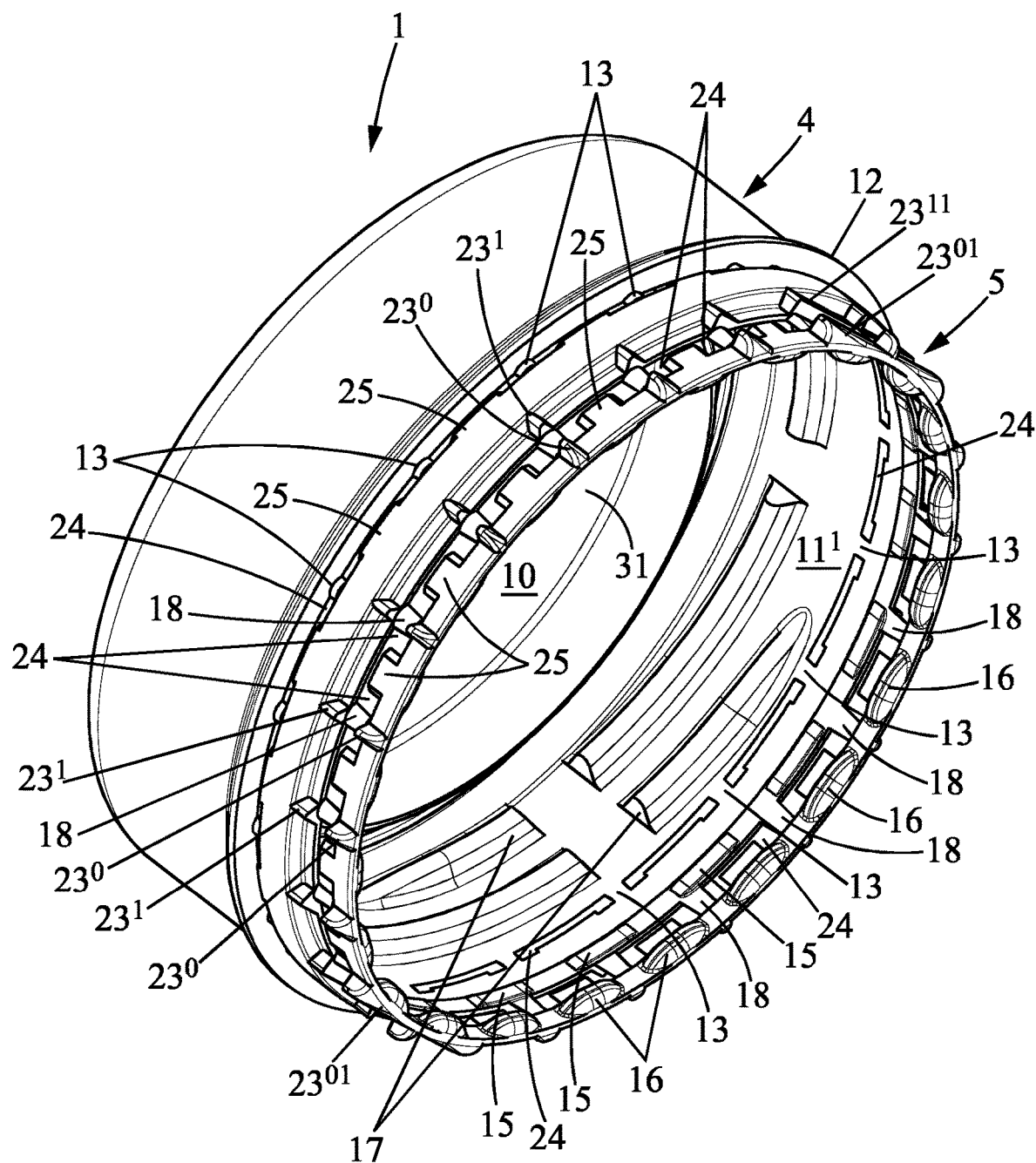
FIG. 1 is a perspective view of a cap according to a first embodiment of the invention, wherein there are two levels of frangible bridges as 1$^{st}$ opening markers and breaking in markers.

The anti-breaking lower shoulders 16 are advantageously regularly and annularly distributed at the bottom edge of the TEB 5 (see e.g FIG. 1). It appears on FIGS. 4A & 5 that the shoulders 16 are housed in a neck's groove 22:

which bottom face is the top face of the support ring 9 of the neck 2, which back 26 is closer from the inner of the neck 2 than the external face 2° of the neck 2 which faces the additional bridges 18, and which top face 21 is outwardly delimited by the above mentioned external face 2°.

In order to impede the way of misusing tools for removing the whole cap 1, before the $1^{st}$ opening, the inner end 27 of each shoulder 16 is advantageously in contact or almost in contact with the back 26 of the neck's groove 26.

Moreover, the upper face 28 of each shoulder 16 is preferably intended to come close, and for instance to abut, the top face 21 of the groove 22 of the neck 2, during the container 3 first opening.

Concerning the shoulders 16, it should be also emphasized that each space between two adjacent shoulders 16 is in line, along an axis parallel to the axis Y-Y of the cap 1—with an additional connection bridge 18, just above placed. According to an alternative not shown on the drawings, the shoulders 16 can be replaced by a single shoulder 16, which would be an inwardly extended ring of axis Y-Y.

Any breaking in is also complicated thanks to the fact:

there is an inward interval (I) shown on FIG. 5 between the inner annular face 19 of each additional lower marker, i.e frangible bridge 18, and the peripheral end 20 of the lock ring 8.

the inner annular face 19 of each additional lower marker 18, i.e frangible bridge 18, is at a minimum interstitial distance d from the facing external face 2° of the neck 2. For instance d=0.01+/−10%.

FIGS. 1 & 2 show a lug 23° at the bottom and a lug $23^1$ at the top of each frangible additional bridges 18 (additional lower markers). These lugs 23 which extend outwardly, respectively, from the lower portion and the upper portion of the TEB 5, act as strengthening pieces of the cap 1 useful for the manufacture and the bottling, but which are not detrimental to the anti-breaking in function of these additional lower markers 18.

It should also be noted that the cap 1 represented on FIGS. 1, 2, 3D includes two diametrally opposed superposed structural protruding units $23^{01}$, $23^{11}$ resulting from the gathering of three of the upper lugs $23^1$ and three corresponding lower lugs $23°$. These protruding units $23^{01}$, $23^{11}$ are undercuts useful notably as the cap 1 is manufactured by means of slides molds.

Before its first opening, the cap 1 according to this first embodiment is protected against illicit opening by means of any tool which can be used to try to remove the whole cap 1, and to possibly commit any offence such as filling offence: the genuine bottle's content is replaced a fake product. FIGS. 14A and 14B show the marks left either by a tool 50 which the infringer unsuccessfully tried to insert between the TEB 5 of the cap 2 and the bottle's neck 2 (left side of FIG. 14A & 14B), or by a heating of the cap 1 (right side of FIGS. 14A & 14B).

As shown on FIG. 14B, the lower markers, i.e the connection bridges 180 are broken off (left side: mechanical breaking in) and/or deformed (right side: thermic breaking in).

Second Embodiment

The cap 1 according to the illustrated second embodiment (FIG. 6), is identical to the cap 1 according to the first embodiment herein above described. It comprises $1^{st}$ opening upper markers constituted by frangible connection bridges 13 and additional breaking in lower markers constituted by frangible bridges 18.

In this variant the connection bridges 13 and 18 are made slitting a molded pre-cap, and more precisely a pre-skirt 110.

Figure 6:
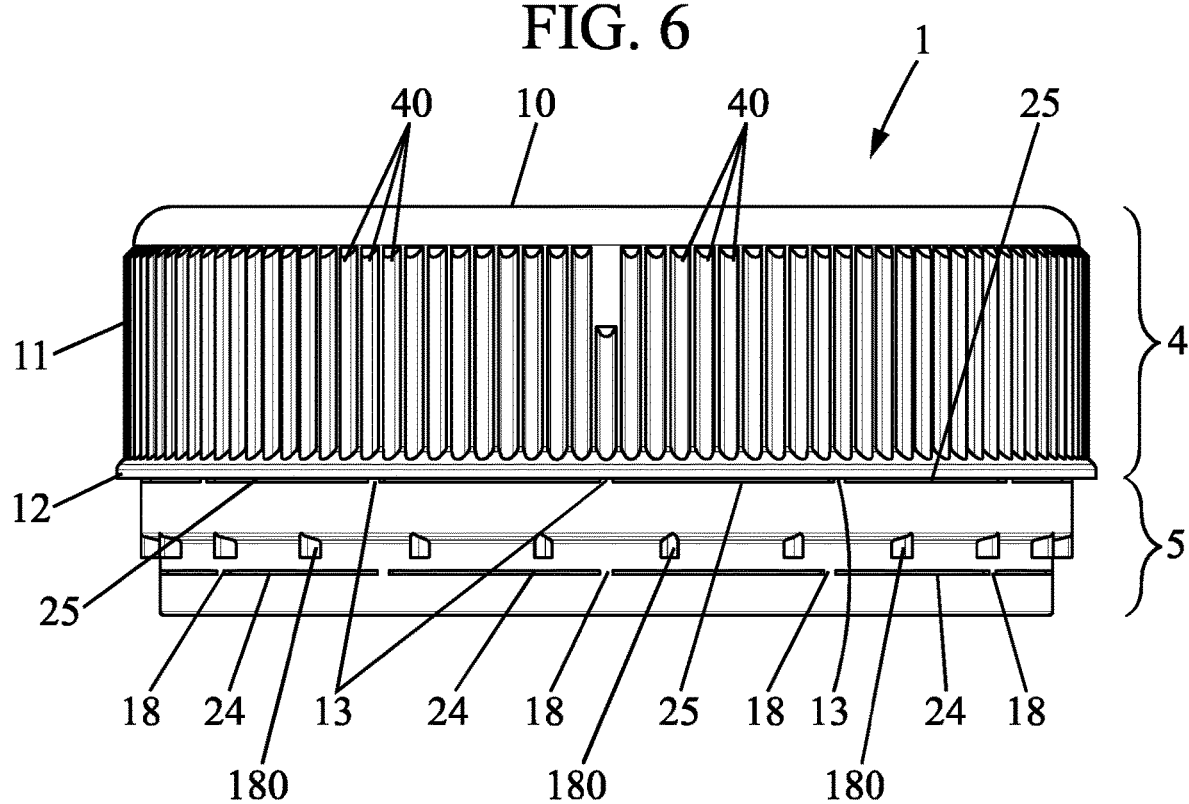
FIG. 6 is a front view of a cap according to a variant of a second embodiment of the invention, wherein there are grasping ribs on the skirt of the cap.

The cap 1 of FIG. 6 has also a plurality of ribs 40 extending parallel to the central axis Y-Y and equally distributed on the outer surface of the skirt 11. The ribs 40 are intended to facilitate the grasping of the cap 1 by the bottling device on the industrial bottling line and by the consumer.

The Raw Materials

For the cap 1, it is for instance a thermoplastic polymer such as high density polyethylene (HDPE), whereas for the bottle 3 it can be a thermoplastic polymer such as PET.

Other Objects Than the Cap 1

The invention also pertains to a system cap 1/bottle 3 such as the one shown on FIGS. 4 and 9. The container can be different from a bottle 3. It can be the preform for the manufacture of the bottle injection/blowing molding, as well as the bottle filled and closed by the whole cap 1.

The Method for Manufacturing the Cap

The cap according to the invention can be obtained by a compression molding process which leads directly to the cap 1 or by a 2-steps injection molding process, wherein a pre-cap consisting of a shell made of a top-wall and of a pre-skirt is manufactured. The pre-skirt is free from the openings 24, 25 delimiting the connection bridges 18, 13. The achievement of these missing elements is then done by slitting the pre-skirt.

Variants

The invention has been disclosed with a cap 1 presenting a symmetry of revolution with a circular top wall 10, an annular skirt 11 of circular cross-section. The invention is however not limited thereto and the cap 1 could be of any other suitable shape, the top wall 10, the skirt 11 and the double level of markers being adapted accordingly.

The invention claimed is:

1. A system composed of a container and a screw cap for a neck of the container, the neck of the container being in a single piece with a rest of the container and having a top edge, which delimits an opening of the container,
    said screw cap comprising:
        a top wall;
        an annular skirt extending downwardly from the top wall and having a bottom edge; and
        a tamper evidence band (TEB) linked to the bottom edge of the annular skirt by first annularly distributed frangible bridges;
    wherein said TEB comprises a top ring and a bottom ring linked to the top ring by at least two second annularly distributed additional frangible bridges;
    wherein both of the first annularly distributed frangible bridges and the second annularly distributed frangible bridges are below the top edge of the neck in an original position,
    wherein the top ring of the TEB between the first annularly distributed frangible bridges and the second annularly distributed frangible bridges is intact after a first licit opening;
    wherein the neck has an external face including, downwardly and successively from the open top end, at least one thread, a lock ring and a support ring;
    wherein a lower face of the top wall is in sealed contact with the top edge in the closed position of said screw cap in the original position and before the first licit opening of the container by unscrewing an upper removable part of the screw cap, said first licit opening involving a rupture of the first annularly distributed frangible bridges, which are upper markers of said first licit opening; and
    wherein each second annularly distributed frangible bridge as a lower marker has an inner annular face, and the inner annular face of each second annularly distributed frangible bridge is inwardly set back with respect to a peripheral end of the lock ring.

2. The system according to claim 1 wherein a height $h^5$ of the top ring of the TEB is lower than a height $h^{11}$ of the annular skirt.

3. The system according to claim 1 wherein:
    the TEB has an inner face presenting at least one inwardly extending upper shoulder which is intended to abut the lock ring of the neck during the first licit opening.

4. The system according to claim 3, wherein:
    the inner face of the TEB presents at least one inwardly extending lower shoulder, said at least one inwardly extending lower shoulder from the inner face of the TEB is intended to come close to a top face of a groove of the neck, during the container first opening.

5. The system according to claim 1 wherein the second annularly distributed frangible bridges as lower markers are intended to display any breaking in of the screw cap before the first licit container opening.

6. The system according to claim 5, wherein the inner annular face of at least one second annularly distributed frangible bridge as the lower marker, is at a minimum interstitial distance d of a facing external face of the neck, said minimum interstitial distance being defined as d≤3 mm.

7. The system according to claim 5, wherein a bottom and/or a top of at least one of the second annularly distributed frangible bridges, comprise(s) a lug (23) which extends outwardly from a lower portion of the TEB and/or from an upper portion of the TEB.

8. The system according to claim 1, wherein the upper markers give marks of said container first opening and the lower markers give marks of said container breaking in, and wherein the marks are visible to the naked eye.

9. The system according to claim 1, wherein the first annularly distributed frangible bridges as the upper markers and/or the second annularly distributed frangible bridges as the lower markers are separated from each other by annular openings, at least one of said annular openings being partially closed by a counter-bridge extending upwardly from a bottom from a lower side of the annular opening or downwardly from an upper side of the annular opening.

10. A method for manufacturing a screw cap, the screw cap comprising:
a top wall;
an annular skirt extending downwardly from the top wall and having a bottom edge; and
a tamper evidence band (TEB) linked to the bottom edge of the annular skirt by first annularly distributed frangible bridges;
wherein said TEB comprises a top ring and a bottom ring linked to the top ring by at least two second annularly distributed frangible bridges;
wherein both of the first annularly distributed frangible bridges and the second annularly distributed frangible bridges are below the top edge of the neck in an original position,
wherein the top ring of the TEB between the first annularly distributed frangible bridges and the second annularly distributed frangible bridges is intact after a first licit opening;
wherein the neck has an external face including, downwardly and successively from the open top end, at least one thread, a lock ring and a support ring;
wherein a lower face of the top wall is in sealed contact with the top edge in the closed position of said screw cap in the original position and before the first licit opening of the container by unscrewing an upper removable part of the screw cap, said first licit opening involving a rupture of the first annularly distributed frangible bridges, which are upper markers of said first licit opening; and
wherein each second annularly distributed frangible bridge as a lower marker has an inner annular face, and the inner annular face of each second annularly distributed frangible bridge is inwardly set back with respect to a peripheral end of the lock ring,
the method comprising the steps of:
molding, in a cavity of a mold, the screw cap having the top wall and a pre-skirt;
slitting the pre-skirt to make openings to obtain the first annularly distributed frangible bridges and second annularly distributed frangible bridges (13, 18), which delimit the annular skirt of the removable part of the screw cap and the upper and the lower portions of the TEB or non-removable part of the screw cap; and
demolding the screw cap.

11. The method according to claim 10 wherein the openings between the first annularly distributed frangible bridges, on the one hand, and the openings between the second annularly distributed frangible bridges, on the other hand, are made by means of a tool which slits simultaneously the pre-skirt of the screw cap at two different heights, or with two tools which slit successively the pre-skirt of the screw cap, at two different heights.

12. A method for bottling a container with a screw cap, the screw cap comprising:
a top wall;
an annular skirt extending downwardly from the top wall and having a bottom edge; and
a tamper evidence band (TEB) linked to the bottom edge of the annular skirt by first annularly distributed frangible bridges;
wherein said TEB comprises a top ring and a bottom ring linked to the top ring by at least two second annularly distributed frangible bridges;
wherein both of the first annularly distributed frangible bridges and the second annularly distributed frangible bridges are below the top edge of the neck in an original position,
wherein the top ring of the TEB between the first annularly distributed frangible bridges and the second annularly distributed frangible bridges is intact after a first licit opening;
wherein the neck has an external face including, downwardly and successively from the open top end, at least one thread, a lock ring and a support ring;
wherein a lower face of the top wall is in sealed contact with the top edge in the closed position of said screw cap in the original position and before the first licit opening of the container by unscrewing an upper removable part of the screw cap, said first licit opening involving a rupture of the first annularly distributed frangible bridges, which are upper markers of said first licit opening; and
wherein each second annularly distributed frangible bridge as a lower marker has an inner annular face, and the inner annular face of each second annularly distributed frangible bridge is inwardly set back with respect to a peripheral end of the lock ring,
the method comprising the steps of:
providing a container;
filling said container with a liquid;
providing the screw cap with a pre-skirt;
closing the container with the screw cap;
slitting the pre-skirt to make the annular openings to obtain the first annularly distributed frangible bridges and the second annularly distributed frangible bridges; and
packaging the closed container.

* * * * *